United States Patent [19]

Michel

[11] Patent Number: 4,640,934

[45] Date of Patent: Feb. 3, 1987

[54] PROCESS FOR THE PREPARATION OF CELLULAR PRODUCTS AND LAMINATES BASED ON FURAN PREPOLYMERS

[76] Inventor: Pierre Michel, Villa Le Mandala, La Mure, La Terrasse, 38660 Le Touvet, France

[21] Appl. No.: 662,404

[22] PCT Filed: Jan. 23, 1984

[86] PCT No.: PCT/FR84/00015

§ 371 Date: Sep. 24, 1984

§ 102(e) Date: Sep. 24, 1984

[87] PCT Pub. No.: WO84/02914

PCT Pub. Date: Aug. 2, 1984

[30] Foreign Application Priority Data

Jan. 23, 1983 [FR] France .................... 83 01151

[51] Int. Cl.$^4$ ............................................. C08J 9/14
[52] U.S. Cl. ................................ 521/103; 521/106; 521/107; 521/114; 521/122; 521/133; 521/136; 521/137; 521/138; 521/181; 521/186; 523/218; 523/219
[58] Field of Search ............... 521/106, 107, 114, 186, 521/181, 136, 103; 523/218, 219

[56] References Cited

U.S. PATENT DOCUMENTS

| | | | |
|---|---|---|---|
| 3,390,107 | 6/1968 | Tashlick et al. | 521/131 |
| 3,779,955 | 12/1973 | Wade | 521/106 |
| 3,919,127 | 11/1975 | Larson et al. | 521/116 |
| 4,132,683 | 1/1979 | Larson et al. | 521/186 |
| 4,548,957 | 10/1985 | Hucke | 521/186 |

FOREIGN PATENT DOCUMENTS

2197045 3/1974 France .
2508918 7/1981 France .

*Primary Examiner*—Morton Foelak
*Attorney, Agent, or Firm*—Fleit, Jacobson, Cohn & Price

[57] ABSTRACT

Process for the preparation of cellular products and laminates based on anhydrous furan prepolymers which possess free OH groups, which is carried out at normal temperature using small amounts of silicon tetrachloride and/or phosphorus oxychloride as the crosslinking and expansion agent, characterised in that a combination of a furfuryl alcohol resin and/or a furfural/phenol (phenol and/or bisphenol A) resin with a bishydroxymethylfuran resin is used as the furan prepolymers, without the use of an acid, the silicon tetrachloride and/or phosphorus oxychloride being used in amounts of 0.1 to 5% by weight, based on the resin employed.

7 Claims, No Drawings

PROCESS FOR THE PREPARATION OF CELLULAR PRODUCTS AND LAMINATES BASED ON FURAN PREPOLYMERS

The present invention relates to the preparation of cellular products and laminates based on furan prepolymers and having an excellent resistance to fire, good hardness properties and good insulating properties.

For this purpose, the invention relates to a process which makes it possible to ensure the progress of the polycondensation and to ensure cross-linking of the furan prepolymer at normal temperature and sufficiently rapidly to ensure virtually simultaneous hardening and, where relevant, expansion of this resin in very short times.

It is known in the art of expanded furan materials that furan resins can be expanded, by themselves or in association with other resins, in particular urea resins, using as the catalyst an acid, chiefly phosphoric acid. Acids are incorporated at high concentrations (10 to 15%) and the polymerisation reactions are slow and require post-curing in order to achieve complete polymerisation.

The Applicant Company has found that it is possible to accelerate the polymerisation reaction and to permit simultaneous hardening and expansion of furan resins by replacing some of the acid used as the catalyst with phosphorus oxychloride and/or silicon tetrachloride dissolved in a glycol phosphate or phenol phosphate, the reaction being carried out at normal temperature. Such a process is the subject of French Patent Application No. 2,508,918, filed by the Applicant.

The chlorine derivative is hydrolysed by the OH radicals present in the reaction medium and being formed as a result of the polycondensation of the furan products, and, since the hydrolysis is highly exothermic, the vigorous and rapid release of heat produced by the formation of $H_3PO_4$ and HCl, in the case of $OPCl_3$, and of $SiO_2$ and HCl, in the case of $SiCl_4$, has the effect of accelerating the crosslinking reaction and of allowing, at a very high rate, simultaneous hardening and expansion by vaporisation of the water included.

However, the addition of acids may lead, at trimerisation, to separation into two phases, with the consequence of a second exothermic reaction which in general causes destruction of the material by autocombustion.

In the course of its research, the Applicant Company has now discovered that a particular combination of furan resins associated with a well defined catalytic system makes it possible to obtain expanded furan materials with an increased heat resistance, the rates of expansion being even higher than those previously obtained.

The present invention thus relates to a process for the preparation of cellular products and laminates based on anhydrous furan prepolymers which possess free OH groups, which is carried out at normal temperature using small amounts of silicon tetrachloride and/or phosphorus oxychloride as the crosslinking and expansion agent, which comprises using, as the furan prepolymers, a combination of a furfuryl alcohol resin and/or a furfural/phenol (phenol or bisphenol A) resin with a bishydroxymethylfuran (BHMF) resin, without the use of an acid, the silicon tetrachloride and/or phosphorus oxychloride being used in amounts of 0.1 to 5% by weight, based on the resin employed.

The result of combining polymers and the catalytic system according to the invention is that expanded materials are obtained which are stable at 350° C. and pass the muffle furnace test (15 minutes at 500° C.) with a positive result, which was not the case with the formulations using acid which are described in Patent Application No. 2,508,918, filed by the Applicant Company.

The omission of the acid also provides the possibility of working with simpler machines, using two components instead of three.

Silicon tetrachloride and phosphorus oxychloride are extremely reactive products and their direct incorporation into the furan resins necessitates particular and meticulous precautions.

It is thus preferable to dissolve them in stable liquids which are inert under the reaction conditions or active in the reaction medium.

It has proved particularly useful to employ trichlorotrifluoroethane, trichlorofluoromethane, pentane, carbon tetrachloride, polytetramethylene glycol ether and various phosphates, particular examples being optionally brominated neopentylglycol phosphate, and tri-$\beta$-chloroethyl phosphate and tri-$\beta$-chloropropyl phosphate.

The use of brominated neopentylglycol phosphate gives very useful results, since incomplete synthesis may leave free a certain amount of the phosphorus oxychloride employed for the purposes described above. Moreover, it gives rise to an improvement in the non-flammability.

The use of carbon tetrachloride, which has a high boiling point, enables reaction mixtures having a higher exothermic peak (corresponding to trimerisation) to be used, with the result that the rates of expansion and hardening are higher, without the danger of bubbles or cracking.

The use of small amounts of tri-$\beta$-chloropropyl phosphate enables the viscosity of the catalytic mixture to be increased, which is important for problems arising from industrial technology.

The use of a very small amount of silicon tetrachloride surprisingly gives rise to qualities of cohesion and homogeneity in the expanded materials, which have better mechanical properties than other expanded materials of the same bulk densities. The production of microcellular substances and the precipitation of silica are largely responsible for this.

Silicon tetrachloride dissolved in carbon tetrachloride is a preferred catalytic system according to the invention.

The various formulations obtained by combining the various types and proportions of the resins with various amounts of phosphorus oxychloride and silicon tetrachloride distributed in the solvents described above enable expanded materials which have a bulk density varying from 12 to 600 kg/m$^3$ and have particular physicochemical properties, depending on their origin, to be obtained.

According to a preferred embodiment of the invention, a combination of a furfural/bisphenol A resin with a BHMF resin is used as the furan prepolymer. Such a combination permits very rapid expansion (a few seconds) to be achieved, which means that the cellular materials obtained can be sprayed with the aid of suitable machines.

It should be noted that small increases in the furfural/bisphenol A resin relative to the BHMF resin permit adjustment of the rates of reaction and a further increase in the heat resistance.

In the process according to the invention, phenolic, polyester and polyurethane resins or various polymerisable chemical compounds, such as isocyanates, can be added to the reaction mixture without decreasing the rates of expansion and polymerisation.

The incorporation of finely divided fillers, such as flue ash and fly ash, solid or hollow glass beads, cut or ground glass fibres, silica, kieselguhr or other very finely divided inert fillers (mica, asbestos and the like) is a means of varying the bulk densities and other characteristics, mechanical as well as physical and chemical, obtained by expansion in blocks or under pressure. It is also possible to add small proportions (10 to 25%), based on the resin, of boron trioxide, which further improves the fire-resistance of the products obtained.

It is also possible to add certain additives, such as anti-foaming agents (surfactants), to the reaction mixture.

The present invention will be better illustrated with the aid of the following Examples, which do not represent a limitation.

In the Examples, the amounts are parts by weight (pw).

EXAMPLE 1

| BHMF resin (Farez B260 from Quaker Oats) | 50 pw |
|---|---|
| Furfuryl alcohol resin | 200 pw |
| Surfactant Si3193 (Rhone Poulenc) | 8 pw |
| $SiCl_4$ | 3 pw |

The required amount of $SiCl_4$ is added in portions to a mixture of the first three compounds at 10°–20° C., with vigorous stirring; expansion takes place after about 40 seconds, with a rapid rise in temperature. Hardening and release from the mould can be carried out after 2 minutes.

EXAMPLE 2

| Quacorr 1300 resin based on furfuryl alcohol (Quaker Oats) | 200 pw |
|---|---|
| BHMF resin Farez B260 (Quaker Oats) | 50 pw |
| Surfactant Si3193 (Rhone Poulenc) | 5 pw |
| Neopentylglycol phosphate | 25 pw |
| $OPCl_3$ | 5 pw |

EXAMPLE 3

| BHMF resin Farez B260 (Quaker Oats) | 200 pw |
|---|---|
| Furfural/bisphenol A resin | 25 pw |
| Polytetramethyleneglycol ether | 30 pw |
| $OPCl_3$ | 5 pw |
| Diphenylmethane diisocyanate | 30 pw |

EXAMPLE 4

| BHMF resin (Farez B260 from Quaker Oats) | 25 pw |
|---|---|
| Resin based on furfuryl alcohol | 300 pw |
| Flue ash (Fillite) (Density 0.2) | 150 pw |
| Trichlorotrifluoroethane | 15 pw |
| $SiCl_4$ | 1 pw |

EXAMPLE 5

| Furfural/bisphenol A resin | 300 pw |
|---|---|
| Polyester resin (AROPOL-ASHLAND) | 100 pw |
| BHMF resin Farez B260 (Quaker Oats) | 50 pw |
| Surfactant Si3193 (Rhone Poulenc) | 5 pw |
| $CCl_3F$ | 10 pw |
| Phosphorus oxychloride | 6 pw |

EXAMPLE 6

| BHMF resin Farez B260 (Quaker Oats) | 300 g |
|---|---|
| Bisphenol A/furfural resin | 10 g |
| Surfactant Si3193 | 7.5 g |
| Catalytic system { $CCl_4$ | 35 g |
| $SiCl_4$ | 3 g |

EXAMPLE 7

| BHMF resin Farez B260 (Quaker Oats) | 100 g |
|---|---|
| Bisphenol A/furfural resin | 100 g |
| Polyester resin (Aropol-Ashland) | 100 g |
| Surfactant Si3193 | 7.5 g |
| Catalytic system { $CCl_4$ | 30 g |
| $SiCl_4$ | 3.5 g |

EXAMPLE 8

| BHMF resin Farez B260 (Quaker Oats) | 300 g |
|---|---|
| Bisphenol A/furfural resin | 10 g |
| Urea/furfural resin | 15 g |
| Surfactant Si3193 | 8 g |
| Catalytic system, tri-β-chloropropyl phosphate | 25 g |
| Trichlorotrifluoroethane | 30 g |
| $SiCl_4$ | 3.5 g |

EXAMPLE 9

| BHMF resin Farez B260 (Quaker Oats) | 200 g |
|---|---|
| Bisphenol A/furfural resin | 10 g |
| Surfactant Si3193 | 7.5 g |
| EKAMERE 259 polyol, UGK | 50 g |
| Diphenylmethane diisocyanate | 80 g |
| Catalytic system { $CCl_4$ | 30 g |
| $SiCl_4$ | 2.5 g |

These various Examples enable expanded materials of 12 to 300 kg/m$^3$ to be obtained; the increase in the amount of filters or casting under pressure enable the bulk density to be increased.

The preparations of resins used in some of the Examples and prepared in the Laboratory are described below.

PREPARATION OF THE FURFURAL/BISPHENOL A RESIN OF EXAMPLES 3 AND 5 TO 9

233 g of bisphenol A dissolved in 300 cm$^3$ of acetone, 480 g of phenol and 25 g of KOH dissolved in 20 g of water are mixed in a reflux reactor.

600 g of furfural are introduced in small portions into the mixture, and this is kept at 95° C. for about 1 hour, with continuous stirring.

The mixture is neutralised with 23 g of lactic acid and distilled. When the internal temperature of the reaction mixture reaches 150° to 157° C., after 1 hour, the resin, which then has a viscosity at normal temperature of 800 to 1,000 cP, is decanted.

PREPARATION OF THE RESIN BASED ON FURFURYL ALCOHOL, FROM EXAMPLE 4

The following products are mixed in a reflux reactor: 700 g of furfuryl alcohol, 187 g of 30% strength formaldehyde, 17 g of methyl alcohol and 9 to 12 cm$^3$ of dilute oxalic acid (10 g of oxalic acid per 90 g of water).

After the mixture has been heated under reflux and stirred for 1 hour at 98°–100° C., it is neutralised, for example with triethanolamine (4 to 7 cm$^3$).

225 to 250 cm$^3$ of water and methyl alcohol are recovered by distillation. The resin is then decanted and, depending on the amount of water extracted, has a viscosity at 20° C. of 1,000 to 18,000 cP.

It can be used as such (low viscosity) or diluted with 60 g of furfuryl alcohol and 60 g of furfuraldehyde (viscosity=15,000 to 18,000 cP).

The rates of expansion, trimerisation and becoming tack-free (non-stick, near to demoulding) are very rapid: 1–2 seconds for the start of expansion and 50–60 seconds to become tack-free, which is useful in the field of spraying onto any outside or inside walls. However, for practical reasons (for example complex moulding), it may be useful to decelerate the reactions. They are a function of the state of condensation of the resins and of the proportions of OPCl$_3$ and SiCl$_4$.

The cellular products obtained are very useful as fire-retardant materials because they are nonflammable and have an excellent dimensional stability under the action of heat, are chemically inert and do not release toxic smoke or gas in case of fire.

Some of their excellent characteristics are:

(1) Autoextinguishability classification (M$_1$)-French Standard Number 92501 (M$_1$ upper limit)
(2) Little or no smoke observed in the course of the M$_1$ test
(3) Tridimensional stability: 200° to 400° C., depending on the formulations
(4) Coefficient of thermal insulation $\lambda$=0.025 to 0.04 kc/m/h/°C. up to about 200° C.

Moreover, as expanded materials with closed cells, the cellular furan materials have very good insulating properties.

It is possible to coat these insulating materials by FRP (fibre reinforcing plastics) techniques with polyester, epoxy or furan laminates and by SMC (sheet moulding compound) techniques with polyester, epoxy or furan resins.

The insulating materials, the structural foams and the laminates, as a function of their stability to heat and their non-flammability, can be used as fire-repellents in construction or aviation, the bodywork of any moving machine and containers, in general.

In addition, the process makes it possible to obtain solid moulded skins, even with low-density samples. The thickness of these moulded skins can vary from 1 to 5 mm and be very hard (Shore hardness: 90-93 DIN 53505).

These cellular products can have a bulk density which varies from 12 to 600 kg/m$^3$, depending on any fillers which may be incorporated, the degree of expansion or the formulation.

The Examples described above should not be considered as limiting. It is evident that variations in the proportions of one or other of the furan resins amongst themselves, variations of the proportions of OPCl$_3$ and SiCl$_4$, and the incorporation of various fillers enable a whole series of formulations with characteristic properties to be obtained.

I claim:

1. A process for the preparation of cellular products and laminates based on anhydrous furan prepolymers which possess free OH groups comprising the steps of:
   providing a furan prepolymer comprising a combination of a bis-hydroxylmethylfuran resin with a furfuryl alcohol resin or furfural/phenol or bis-phenol A resin at ambient temperature;
   providing a catalytic agent by dissolving a cross-linking and expansion agent selected from the group consisting of silicon tetrachloride and phosphorus oxychloride in a solvent selected from the group consisting of trichlorotrifluoroethane, trichlorofluoromethane, pentane, carbon tetrachloride, polytetramethyleneglycol ether, neopentylglycol phosphate, brominated neopentylglycol phosphate, tri-$\beta$-chloroethyl phosphate and tri-$\beta$-chloropropyl phosphate; and
   mixing said furan prepolymer and said catalytic agent in an amount of 0.1 to 5% by weight of said furan prepolymer in the absence of acid at ambient temperature under pressure whereby expansion and curing of the furan prepolymer occurs.

2. The process of claim 1 wherein a combination of a furfural/bis-phenol A resin with a bis-hydroxymethylfuran resin is used as the furan prepolymer.

3. The process of claim 1 wherein silicon tetrachloride is used as the cross-linking and expansion agent.

4. The process of claim 1 wherein silicon tetrachloride dissolved in carbon tetrachloride is used as said catalytic additive.

5. The process of claim 1 wherein the furan prepolymer is used in combination with other resins selected from the group consisting of phenolic, polyester and polyurethane resins or with polymerizable isocyanate chemical compounds.

6. The process of claim 1 wherein fillers selected from the group consisting of flue ash, fly ash, glass beads, glass fibres, silica, kieselguhr and boron trioxide are further added to the furan prepolymer.

7. The process of claim 1 wherein foam control agents are further incorporated into the furan prepolymer.

* * * * *